US008264613B2

(12) United States Patent
Harris et al.

(10) Patent No.: US 8,264,613 B2
(45) Date of Patent: Sep. 11, 2012

(54) METHODS AND SYSTEMS FOR CORRECTING STREAMING VIDEO SIGNALS

(75) Inventors: Scott Harris, Woodinville, WA (US); Tyler Harris, Woodinville, WA (US); Ronald F. Rykowski, Bellevue, WA (US)

(73) Assignee: Radiant ZEMAX, LLC, Redmond, WA (US)

( * ) Notice: Subject to any disclaimer, the term of this patent is extended or adjusted under 35 U.S.C. 154(b) by 383 days.

(21) Appl. No.: 12/718,870

(22) Filed: Mar. 5, 2010

(65) Prior Publication Data

US 2010/0225819 A1 Sep. 9, 2010

Related U.S. Application Data

(60) Provisional application No. 61/158,273, filed on Mar. 6, 2009.

(51) Int. Cl.
*H04N 5/21* (2006.01)
*H04N 5/202* (2006.01)

(52) U.S. Cl. ......................... 348/607; 348/624; 348/674

(58) Field of Classification Search .................. 348/607, 348/624, 625, 630, 674, 675, 708, 189, 191–193; *H04N 5/21, 17/00, 17/02, 5/202, 9/69, 9/64*
See application file for complete search history.

(56) References Cited

U.S. PATENT DOCUMENTS 5,161,017 A * 11/1992 Sato .............................. 348/614
5,430,486 A * 7/1995 Fraser et al. ............... 348/426.1
7,907,154 B2 3/2011 Rykowski et al.
7,911,485 B2 3/2011 Rykowski et al.

OTHER PUBLICATIONS

Harris, Scott, "Color and Luminance Uniformity Correction for LED Video Screens," <http://www.signindustry.com/led/articles/2007-10-15-SH-PulseWidthModulationPWMCorrectionOfLEDDisplays.php3>, internet accessed Feb. 24, 2009, 7 pages.

* cited by examiner

*Primary Examiner* — Sherrie Hsia
(74) *Attorney, Agent, or Firm* — Perkins Coie LLP

(57) ABSTRACT

The present disclosure is directed to methods, systems, and apparatuses for modifying streaming video signals to be shown on a visual display. In one embodiment, a method includes receiving a streaming video signal with multiple display components. The method also includes isolating and transmitting the display components to a multiplier according to an associated clock signal for each of the display components. The method further includes fetching correction coefficients from a storage circuit. The correction coefficients correspond to individual display components. The method also includes presenting the correction coefficients to the multiplier along with the display components according to the associated clock signals, and adjusting the display components with the corresponding correction coefficients to form corrected display components of the streaming video signal. The method also includes collecting the adjusted display components into a corrected streaming video signal.

29 Claims, 5 Drawing Sheets

METHODS AND SYSTEMS FOR CORRECTING STREAMING VIDEO SIGNALS

CROSS-REFERENCE TO RELATED APPLICATION

This application claims the benefit of U.S. Provisional Application No. 61/158,273, entitled METHOD AND APPARATUS FOR PIXEL UNIFORMITY CORRECTION, filed Mar. 6, 2009, which is hereby incorporated by reference in its entirety.

TECHNICAL FIELD

The present disclosure relates generally to systems and methods of improving the viewing characteristics of electronic visual displays and, more particularly, to adjusting or correcting streaming video signals for improved viewing characteristics on such displays.

BACKGROUND

Signs are frequently used for displaying information to viewers. Such signs include, for example, billboards or other types of large outdoor displays, including electronic visual displays. Electronic visual displays or signs are typically very large, often measuring several hundred square feet in size. Electronic signs or displays have become a common form of advertising. For example, such displays are frequently found in sports stadiums, arenas, public forums, and/or other public venues for advertising diverse types of information. These displays are often designed to catch a viewer's attention and create a memorable impression very quickly.

DETAILED DESCRIPTION

A. Overview

Figure 1:
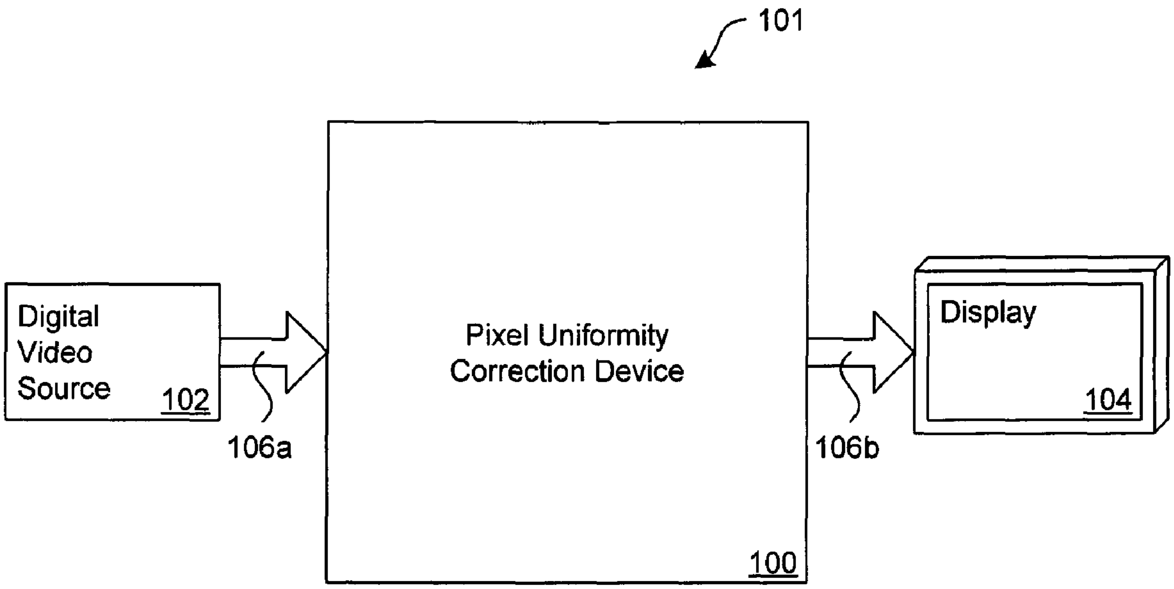
FIG. 1 is a schematic view of a video processing system configured in accordance with an embodiment of the disclosure.

The following disclosure describes systems and associated methods for processing or correcting streaming video to be shown on visual display signs, such as electronic visual displays. As described in detail below, a video correction system configured in accordance with one embodiment of the disclosure includes a first interface configured to receive a streaming video signal and to isolate individual display components or values of the streaming video signal (e.g., color components, such as red, green, and blue components). The first interface is coupled to a selection circuit that is configured to stream the display values to a multiplier according to clock signals associated with the corresponding display values. The system also includes a storage circuit that stores correction coefficients for the corresponding individual display values, and a fetch circuit that is coupled to the storage circuit. The fetch circuit retrieves the correction coefficients from the storage circuit and presents the correction coefficients to the multiplier along with the corresponding display values according to the associated clock signals. The system also includes a second interface coupled to the multiplier and configured to regroup individual corrected display values into a corrected streaming video. The second interface is further configured to communicate the corrected streaming video signal to an electronic display.

According to another embodiment of the disclosure, a method for correcting streaming video signals to be shown on a display includes receiving a streaming video signal with multiple display components. In one embodiment, these display components can include color components, such as, for example, red, green, and blue color components of a pixel of the streaming video signal. The method also includes isolating and transmitting the display components to a multiplier according to an associated clock signal for each of the display components. The method further includes fetching correction coefficients from a storage circuit. The correction coefficients correspond to individual display components. The method also includes presenting the correction coefficients to the multiplier along with the display components according to the associated clock signals, and adjusting the display components with the corresponding correction coefficients to form corrected display components of the streaming video signal. The method also includes collecting the adjusted display components into a corrected streaming video signal.

The methods and systems disclosed herein are configured to dynamically correct, calibrate, or otherwise adjust streaming video signals. More specifically, the correction coefficients of the embodiments described herein can be configured to achieve desired display characteristics of the streaming video signal after correcting or otherwise adjusting the streaming video signal with the correction coefficients. For example, and as described in detail below, the correction coefficients can be calculated or chosen to account for different input level signals of the input streaming video signal to achieve desired viewing characteristics of the streaming video signal. More specifically, the values of the retrieved correction coefficients can vary according to the values of the corresponding input level signals of the input streaming video signal.

Certain details are set forth in the following description and in FIGS. 1-5 to provide a thorough understanding of various embodiments of the disclosure. However, other details describing well-known structures and systems often associated with visual displays and related optical equipment and/or other aspects of signal processing and visual display calibration systems are not set forth below to avoid unnecessarily obscuring the description of various embodiments of the disclosure. Moreover, the terms circuits, components, devices, etc. are intended into encompass the various hardware and/or software features of the systems and methods described herein.

Many of the details, dimensions, angles, and other features shown in the Figures are merely illustrative of particular embodiments of the disclosure. Accordingly, other embodiments can have other details and features without departing from the spirit or scope of the present disclosure. In addition, those of ordinary skill in the art will appreciate that further embodiments of the disclosure can be practiced without several of the details described below.

B. Embodiments of Systems and Associated Methods for Processing Streaming Video Signals to be Shown on Electronic Visual Displays FIG. 1 is a schematic view of a video processing system 101 configured in accordance with an embodiment of the disclosure. The system 101 includes a signal processor or pixel uniformity correction device 100 coupled between a digital video source 102 and a sign or display 104. The display 104 can be any type of suitable electronic display or sign for showing streaming video, including for example, a relatively large or relatively small electronic display or sign, an LED display, a projector, etc. The correction device 100 of FIG. 1 is distinguished in at least one aspect from conventional pixel correction systems in that the correction device 100 of FIG. 1 is configured to receive and correct or otherwise adjust a streaming video signal 106*a*. Correspondingly, the video signal transmitted from the correction device 100 to the display 104 is a corrected or adjusted streaming video signal 106*b*. One shortcoming of conventional technology is an inability to correct streaming video or images. For example, the conventional technology requires that each individual pixel or module of pixels of a display undergo specific correction steps on dedicated hardware. According to embodiments of the present disclosure, however, the correction device 100 is configured to correct the display values of the streaming video signal, such as luminance and chrominance values, at the point where a pulse-width modulation (PWM) signal to a specific LED or LED module of the display 104 is defined.

The inventors have discovered that instead of making corrections to individual pixel signals, inventive hardware configurations and algorithms according to the present disclosure can be used to make corrections to composite video signals. The hardware and algorithmic embodiments described herein accordingly provide more efficient solutions than the conventional technology, and can also provide significant cost savings. For instance, since each LED or LED module of a display no longer needs to be individually corrected according to embodiments of the present disclosure, substantial cost savings in electronic circuitry may be realized.

In another example, since correction now may occur on a composite video signal according to embodiments of the present disclosure, the correction systems of the present disclosure may be placed at a more convenient location relative to the LED display than previously known. For example, in installations where the LED display is readily accessible, the correction hardware may be located directly adjacent to the display. In other installations, however, such as where the LED display may be mostly inaccessible (e.g., elevated on a tower or a building wall), the correction systems according to the present disclosure may be located at a substantially greater distance from the LED display.

In still another example, the correction systems according to the present disclosure may correct or otherwise process streaming video signals that can be wireless transmitted to a display sign. In these embodiments, regular maintenance of an LED display is simple and convenient because no correction needs to be performed at the site of the individual LEDs or modules.

Figure 2:
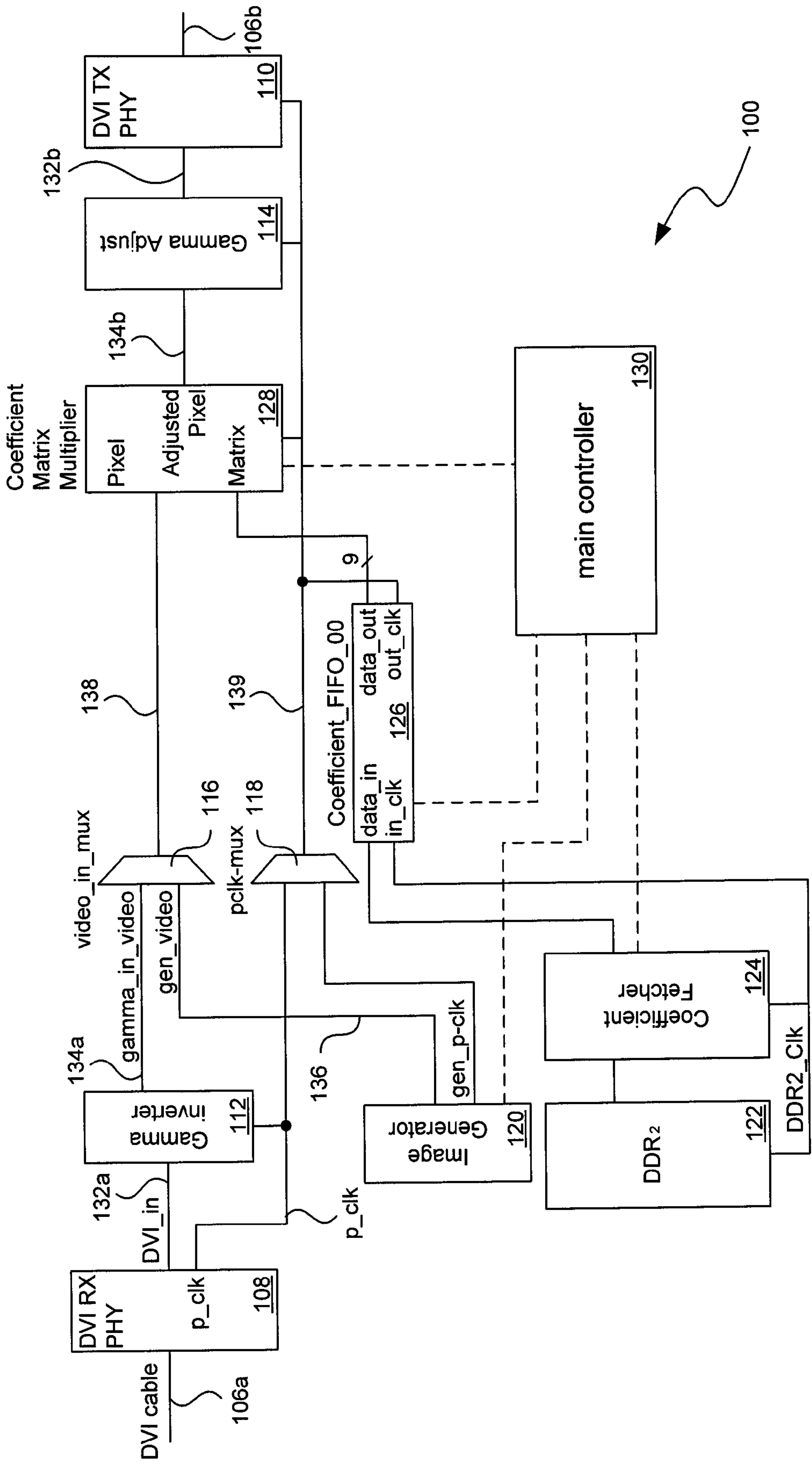
FIG. 2 is a schematic diagram of a component of the video processing system of FIG. 1.

FIG. 2 is a schematic diagram of the correction device 100 of the video processing system 101 of FIG. 1. The correction device 100 illustrated in FIG. 2 includes an interface 108 configured to receive the streaming video signal 106*a* from its source and to transmit the streaming video signal 106*a* to other components of the correction device 100. The correction device 100 also includes a second interface 110 that is configured to transmit the corrected streaming video signal 106*b* to a display or sign. In some embodiments, the second interface 110 transmits the corrected streaming video 106*b* directly to a display device. In other embodiments, however, the second interface 110 can amplify, convert, store, wirelessly communicate or otherwise process the corrected video stream 106*b*.

In the illustrated embodiment, the pixel uniformity correction device 100 also includes conversion circuits or matching gamma decoder/encoder components 112, 114, source selection multiplexer components 116, 118, a static image generation component 120, a block memory component 122, a memory fetch circuit or interface component 124, a correction coefficient fetcher component 126 (e.g., such as a first-in first-out or "FIFO"), a multiplier component 128, a reconversion circuit or gamma decode/encode component 114, and a main processor or controller 130. It is understood that additional components, circuits, hardware, and/or software known to those skilled in the art may be incorporated in the correction device 100 but not shown or described herein to avoid unnecessarily obscuring aspects of the disclosure. Several of the features of the operation and interaction of the components of the correction device 100 are described in detail below.

In the illustrated embodiment, the correction device 100 is configured to apply correction coefficients to display values or components (e.g., color or luminance components) of the streaming video signal for the purpose of providing the corrected or adjusted streaming video signal. This corrected streaming video signal is calibrated such that the display that shows the corrected streaming video has a desired appearance or desired display properties. Suitable methods and systems for determining correction coefficients or factors are disclosed in U.S. patent application Ser. No. 10/455,146, entitled "Method and Apparatus for On-Site Calibration of Visual Displays," filed Jun. 4, 2003, and U.S. patent application Ser. No. 10/653,559, entitled "Method and Apparatus for On-Site Calibration of Visual Displays," filed Sep. 2, 2003, each of which is incorporated herein by reference in its entirety.

In the embodiment illustrated in FIG. 2, the digital video stream 106*a* can have a Digital Video Interface (DVI) format. The embodiments described herein can accordingly be related to the DVI format developed by the Digital Display Working Group (DDWG). The DVI format carries uncompressed digital video signal data to an output display device. In DVI format, the desired display properties of pixels, such as pixel illumination for example, are encoded as binary data. Additionally, the DVI formatted signal can be encoded to a particular device having a native resolution and refresh rate. Thus, each pixel of the output display has a representative display value, such as an illumination value, for that pixel in the digital video data stream. Accordingly, one of ordinary skill in the art will understand that correction of each encoded representative display value in the video stream will affect the display properties of individual pixels of the output display. In other embodiments, however, the correction device 100 may be made compatible with any streaming video signal format. For example, other video formats that do not have the corresponding one-to-one relationship of DVI are not precluded from correction with the pixel uniformity correction device 100 disclosed herein. In certain embodiments, additional processing of the video stream can be used to identify and correct display pixels.

In operation, a streaming digital video signal source or DVI source provides the video signal 106*a* to the first interface 108. The first interface 108 performs such tasks as signal level matching, signal equalization, signal isolation, electrostatic discharge protection, and the like. More specifically, the first interface 108 can isolate display values or components into an isolated input signal 132*a*. The isolated input signal 132*a* can accordingly include isolated display values or components, such as color values and/or luminance values, for each pixel of a displayable image represented in the video stream signal 106*a*. For example, these isolated display values can represent gray values for each of the three primary light colors: red, green, and blue (RGB) of the streaming video signal 106*a*. In addition, the first interface 108 separates the isolated input signal 132*a* (e.g., the raw DVI format signal) from an associated clock signal p_clk. Both the isolated input signal 132*a* and the clock signal p_clk are propagated to the gamma decoder 112.

Because the luminance values of the streaming video signal 106*a* will not be reproduced linearly by the display, the gamma decoder 112 converts the display values or components into a linear space for each pixel of a displayable image represented in the video stream signal 106*a* for further processing. More specifically, the streaming video signal 106*a* in the embodiment of FIG. 2 is communicated as a series of images that will be rendered on a display. The gamma decoder 112 converts the isolated input signal 132*a* into a decoded video signal 134*a* by performing a reverse gamma calculation of each pixel of each image of the isolated input signal 132*a* to produce new or relative luminance values in the linear space. These relative luminance values produced by the gamma decoder 112 are the relative luminance values as these values will be shown on the display. In certain embodiments, the luminance values are represented as 16-bit magnitudes of each of three primary light colors: red, green, and blue (RGB). Accordingly, one component of the decoded video stream 134*a* passing from the gamma decoder 112 is a stream of 48-bit values. Each 48-bit value is associated with a single pixel, and each 48-bit value comprises three 16-bit values. The three 16-bit values, including one for each color (RGB), represent a 0-65535 magnitude luminance value for the respective color of the respective pixel. In other embodiments, however, the bit values of the corresponding luminance values can be greater than or less than 16 bits. For example, the bit values, can be 9, bits, 10 bits, 11, bits, 12 bits, etc. Moreover, additional display values or components making up the decoded video stream 134*a* can include signals such as horizontal sync, vertical sync, data enable, and the like.

In addition to or in place of the input video stream signal 106*a*, the pixel uniformity correction device 100 may also generate a signal with the static image generator 120. The static image generator 120 is configured to produce a static image stream 136 that comprises a bit-wise structure similar in form to the decoded video stream 134*a*. The static image generator 120 also produces a generated clock signal gen_p_clk. For example, a video stream of static images 136 can be represented by 24-bit RGB luminance values corresponding to each pixel of a displayable image. In addition, the static image stream 136 can also have control bits corresponding to the control bits produced by the gamma decoder 112.

Typically, the static image generator 120 is used for testing and calibration of LED displays. For example, the static image generator can generate signals representing solid screens of individual RGB colors that can be streamed through the pixel uniformity correction device 100 for observation on a display or sign to calibrate or otherwise adjust the display properties of the output. In the embodiment illustrated in FIG. 2, the decoded video stream 134*a* and the static image stream 136 are introduced to one or more image selection multiplexers 116, 118. A multiplexer selection control signal determines which of the data streams will be passed through the pixel uniformity correction device 100. Each of the data streams (e.g., the decoded video stream 134*a* and the static image stream 136) has a corresponding clock signal (e.g., the clock signal p_clk and the generated clock signal gen_p_clk, respectively). Thus, the same selection control signal can be used to control both multiplexers 116, 118. In the illustrated embodiment, the first multiplexer 116 can a multi-bit device that selects and passes either decoded video stream 134*a* or static image stream 136. The second multiplexer 118 can be a single bit device that selects and passes either the clock signal p_clk from physical interface 108 or the generated clock signal gen_p_clk from the static image generator 120.

The fast multiplier 128 receives the video streams from the multiplexers 116, 118 to apply the correction coefficients to these video streams. For example, the fast multiplier 128 can receive the selected video stream 138 from the first multiplexer 116, and the selected clock signal 139 from the second multiplexer 118. To properly correct LED display pixels, each of the display values, such as the RGB luminosity values, is adjusted with an associated set of correction coefficients. The fast multiplier 128 is the component of the correction device 100 that performs the adjustment of the display values according to the correction coefficients.

The correction coefficients that the correction device 100 applies to the streaming video signal can be configured to dynamically correct, calibrate, or otherwise adjust the streaming video signal. For example, the correction coefficients can be selected or calculated to account for different input levels of the inputs streaming video signal to achieve desired display characteristics of the streaming video signal after correcting or otherwise adjusting the streaming video signal with the correction coefficients. More specifically, in certain embodiments, the correction coefficients can be configured to correct the streaming video signal to produce the output streaming video signal that will be shown with generally uniform display characteristics or properties (e.g., with generally uniformity across the LED pixels of the display). In other embodiments, however, uniform display characteristics may not be desired. For example, in certain cases a user may want to show a streaming video on a display according to the full brightness of the display, at a sacrifice of the uniformity of the display. As such, the correction coefficients that are applied to the streaming video signal can accordingly adjust or otherwise condition the signal such that the output streaming video signal will be shown on the display according to the desired full brightness of the display. In other embodiments, the correction coefficients can be selected to achieve other display characteristics other than full brightness of the display. As such, the values of the retrieved correction coefficients can vary according to the values of the corresponding input level signals of the input streaming video signal.

As illustrated in FIG. 2, the block memory device 122 is configured to store the correction coefficients for a particular display or sign. The block memory 122 can include any type of suitable memory including, for example, volatile memory, non-volatile memory, or some combination of both. In certain embodiments, the block memory 122 can have sufficient capacity to store a set of correction coefficients capable of adjusting each pixel of a single display. In other embodiments, however, the block memory 122 may also be much larger and may have additional capabilities. For example, in some cases, the block memory 122 is large enough to hold correction coefficients for multiple displays, for different lighting conditions during a particular day or season, for default values, for minimum or maximum values, etc.

The main controller 130 is configured to direct the operation of the pixel uniformity correction device 100. For example, the main controller 130 keeps track of the progress of the selected video stream 138 and directs the memory fetch interface 124 to retrieve particular correction coefficients from block memory 122. The memory fetch interface 124 negotiates bus traffic, retrieves the directed coefficients, and supplies the correction coefficients to the coefficient FIFO 126.

The coefficient FIFO 126, which shares the selected clock signal 139 from the second multiplexer 118, cooperatively provides correction coefficients to the fast multiplier 128. Accordingly, the correction FIFO 126 provides the correction coefficients to the multiplier 128 in a manner that corresponds with the display values passed to the multiplier 128. Within the multiplier 128, which may be integrated with main controller 130, matrix calculations take place to adjust the display values of the selected video stream 138, such as the RGB luminosity values of the selected video stream 138. For example, the multiplier 128 can adjust each 16-bit RGB value of the selected data stream 138 by multiplying the 16-bit value with three corresponding correction coefficients, one each for RGB. In one embodiment, each of the correction coefficients can be 12 bits. In other embodiments, however, each of the coefficients can be greater than or less than 12 bits. The output of multiplier 128 is an adjusted or corrected streaming video signal **134*b*** having the same bit-wise constitution of the input signal, but having adjusted or corrected display values.

At this point, although the adjusted video stream **134*b* includes the correction factors for the corresponding display values, the adjusted video stream 134*b* needs to be re-encoded or re-converted into a digital video signal format. As such, the gamma encoder 114 performs the forward gamma conversion to re-encode the adjusted video stream 134*b* into its original gamma space as the adjusted or corrected re-encoded signal 132*b*. The second interface 110 transmits the corrected and re-encoded video signal 132*b* back onto a communications medium as a corrected streaming video signal 106*b***.

The correction device 100 can also be configured to account for the resolution and display capabilities of the display that will ultimately show the corrected streaming video signal **106*b*. In certain embodiments, for example, an output port of the correction device 100 can be configured to read Extended Display Identification Data (EDID) from the display that will show the streaming video signal. The correction device 100 can store the EDID to memory coupled to the input port of the correction device 100, such as, for example, EEPROM coupled to the input port. Moreover, in still further embodiments, and as described in detail below with reference to FIG. 5, the correction device 100** can also be configured to account for any scaling of the streaming video signal.

Further details are described below regarding the processing of the pixels (e.g., pixels from the video stream signal) through the pixel uniformity correction device 100 illustrated in FIG. 2. For example, at a first phase, a pixel is transmitted by the source, into the pixel uniformity correction device 100. The pixel uniformity correction device 100 receives this pixel at the first interface 108, such as a TFP403, which is a DVI receiver PHY. This pixel can be represented as three 16 bit color components: red, green, and glue (RGB). The pixel can also be represented as two framing signals: horizontal synchronization (hsync) and vertical synchronization (vsync). The pixel can be represented in the matrix of Equation 1.

$$\begin{bmatrix} R_{input} \\ G_{input} \\ B_{input} \end{bmatrix} \quad \text{Equation 1}$$

At a second phase, the pixel is run through a data enable generator, which uses the framing signals to generate a data enable pulse when the pixel is intended to be interpreted as a valid pixel. This data enable pulse is then transmitted with the rest of the pixel for the remainder of the pixel processing. The pixel color components are not altered at this stage.

At a third phase, the pixel then undergoes a reverse gamma calculation within the gamma decoder 112. The level of reverse gamma calculation may be set by the user. The core is configured by the main processor 130, for example a Xilinx MicroBlaze processor, across a PLB bus. Although most displays have gamma correction, in certain embodiments, reverse gamma calculations may not be needed. However, even if the reverse gamma calculations were not required, the pixels may still be converted from 8 bit to 16 bit via a lookup table, such as a linear lookup table for example, if no gamma correction is used.

At a fourth phase, the pixel uniformity correction device 100 has the ability to produce its own source pixels for the purpose of driving test patterns onto the display or sign. These test patterns, which are generated by the static image generator 120, are used to assist in data collection necessary to produce coefficient data for a display. During normal operation, however, the static image generator 120 is disabled and pixels from the gamma decoder 112 are not affected by the static image generator.

At a fifth phase, the pixel is transformed by the correction coefficients stored in the memory block 122. The nine transforming correction coefficients are expressly correlated to a specific pixel position in the output display. Each correction coefficient in the embodiment of FIG. 2 is 12 bits, however in other embodiments other bit resolutions are possible. In the illustrated example, a total of 108 bits of correction for each pixel are maintained. The correction coefficient sets are served by the coefficient FIFO's in the order that pixels come into the pixel uniformity correction device 100 according to the associated clock signals. In streaming video following the DVI format, for example, the pixel stream is delivered left to right, top to bottom. Each pixel is altered using the matrix transformation of Equation 2. At this point, the output RGB values of Equation 2 (e.g., $R_{adjust}$, $G_{adjust}$, and $B_{adjust}$) are still 16 bits per color.

$$\begin{bmatrix} Coef_{00} & Coef_{01} & Coef_{02} \\ Coef_{00} & Coef_{01} & Coef_{02} \\ Coef_{00} & Coef_{01} & Coef_{02} \end{bmatrix} \times \begin{bmatrix} R_{input} \\ G_{input} \\ B_{input} \end{bmatrix} = \begin{bmatrix} R_{adjust} \\ G_{adjust} \\ B_{adjust} \end{bmatrix} \quad \text{Equation 2}$$

Further at the fifth phase, the multiplication step can be performed in a three state pipeline. At stage 1, incoming coefficients are latched and pixel data is latched. This helps improve timing into the multipliers. At stage 2, each color value is multiplied by the individual color coefficients. For example the first row of the matrix, which adjusts the red value of the targeted pixel, would produce the following 3 values of Equations 3-5:

$$\mathrm{Coef}_{00} \times R_{input} = R_{applied0} \quad \text{Equation 3}$$

$$\mathrm{Coef}_{01} \times G_{input} = G_{applied0} \quad \text{Equation 4}$$

$$\mathrm{Coef}_{02} \times B_{input} = B_{applied0} \quad \text{Equation 5}$$

At stage 3, the color components of each row are added to form the new red color component for that row. That is:

$$R_{applied0}+G_{applied0}+B_{applied0}=R_{adjust} \quad \text{Equation 6}$$

At a sixth phase, if necessary, the adjusted pixel undergoes gamma readjustment at the gamma encoder 114. This re-adjustment applies a complementary transform to that which was applied by the gamma decoder 112 during the reverse gamma calculations. Moreover, in the rare instances where the gamma correction is not required, the adjusted pixels are still converted from 16 bit back to 8 bit with a forward gamma conversion via a lookup table.

At a seventh phase, the adjusted pixel is sent through the second interface 110, such as a TFP410, which is a DVI output PHY, to transmit the pixel out of the pixel uniformity correction device 100. At this point, the pixel, which is one pixel in the video stream, may be transmitted to the display or may undergo further processing.

In certain embodiments, the streaming video data signal includes large quantities of pixel data. The correction device 100 can store corresponding correction coefficients and repeatedly fetch the correction coefficients from the memory block 122 by the memory fetch interface 124. In certain embodiments, limitations of the memory controller may require at least one correction coefficient fetch interface 124 for every 2 correction coefficient FIFOs 126. Moreover, the fetch interfaces 124 can used in burst mode to issue large read burst commands into the memory controller associated with memory block 122, and push the retrieved data into the correction coefficient FIFOs 126. In addition, for fetch interfaces 124 that serve multiple FIFOs 126, an alternating read burst strategy may be used. For example, the function of the FIFOs 126 can be configured to hold burst data from the fetch interfaces 124, and then to serve the data cooperatively into the multiplier circuit 128 where the correction coefficients are applied to the corresponding display values. This operation performs similar to a leaky bucket algorithm used in network communications.

Figure 3:
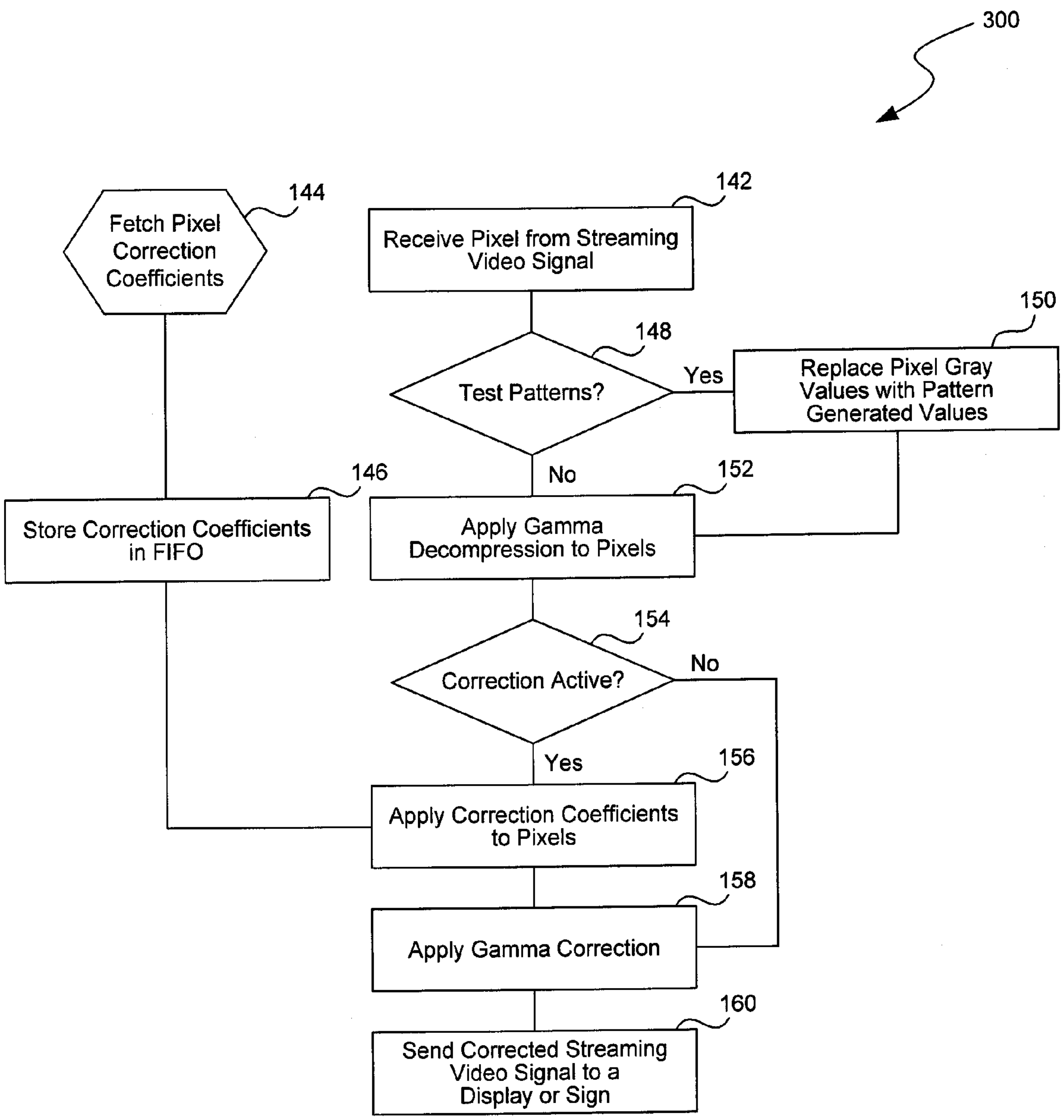
FIG. 3 is a flow diagram of a method or process configured in accordance with an embodiment of the disclosure.

FIG. 3 is a flow diagram of a method or process 300 configured in accordance with an embodiment of the disclosure that can be implemented by the pixel uniformity correction device 100 illustrated in FIG. 2. In this regard, each described process may represent a module, segment, or portion of code, which comprises one or more executable instructions stored on a computer readable storage medium that, when executed by a computing device, cause the computing device to perform the specified functions disclosed herein. As will be appreciated by one of ordinary skill in the art, in some embodiments the functions noted in the process may occur in a different order, may include additional functions, may occur concurrently, and/or may be omitted.

With reference to FIG. 3, the method 300 includes receiving a streaming video signal and identifying individual pixels (block 142). Concurrently, the method 300 includes fetching individual pixel correction coefficients from memory (block 144), and storing the correction coefficients in a FIFO (block 146). As indicated at block 148, if the individual pixels represent a test pattern including pixel gray values, the method 300 includes replacing the pixel gray values with static pattern generated values (block 150). If the individual pixels do not represent the test pattern, the method includes applying gamma decompression to the pixels (block 152). As indicated at block 154, if it is determined that correction is active, the method 300 further includes applying the fetched correction coefficients from the FIFO to the individual pixels (block 156). The method 300 further includes recompressing the streaming video signal by the gamma component (block 158), and communicating the corrected streaming video signal to a sign or display (block 160).

Figure 4:
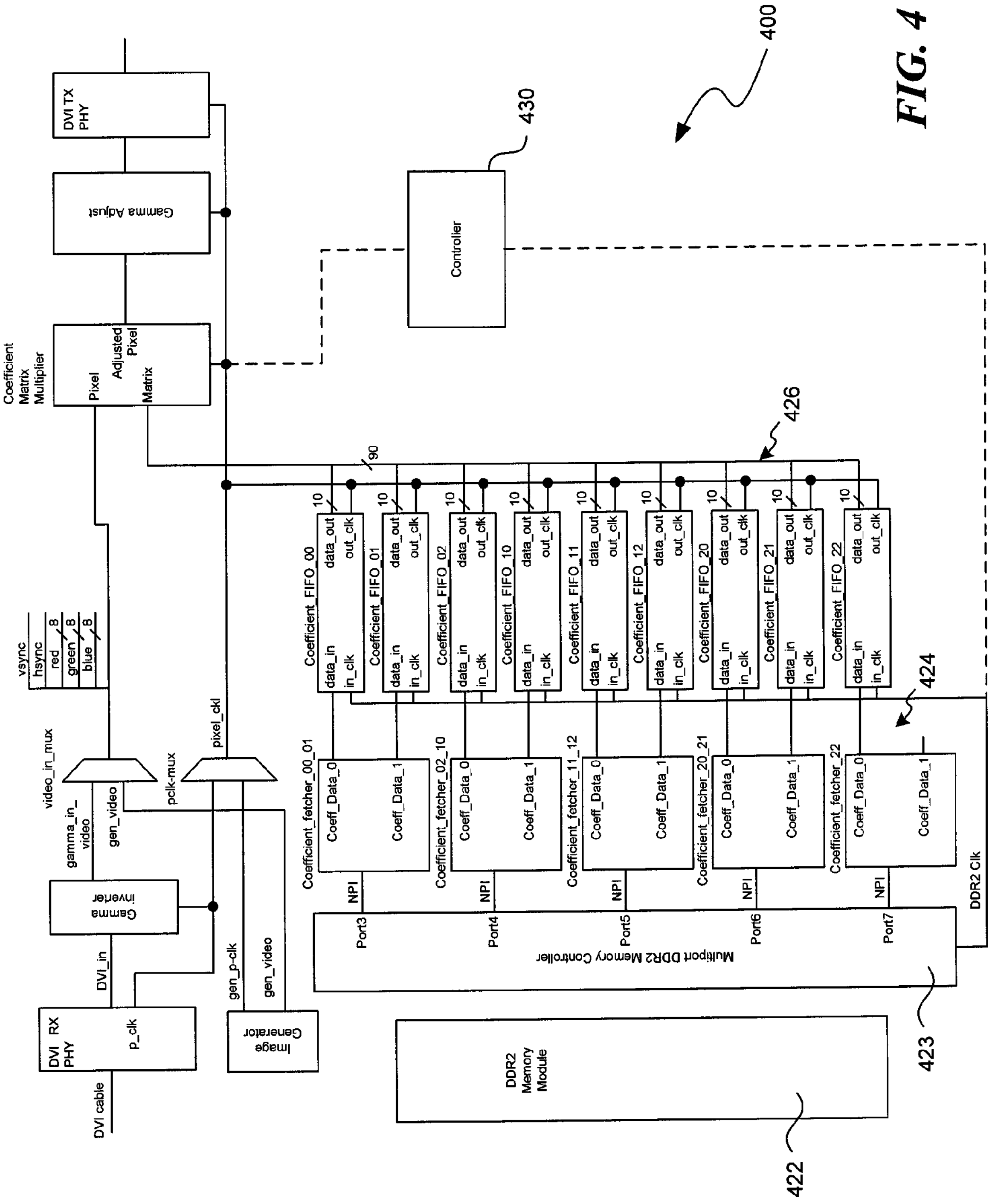
FIG. 4 is a schematic diagram of a component of a video processing system configured in accordance with another embodiment of the disclosure.

FIG. 4 is a schematic diagram of a component of a correction device 400 configured in accordance with another embodiment of the disclosure. The correction device 400 includes several features that are generally similar in structure and function to the corresponding features of the correction device 100 described above with reference to FIGS. 1-3. In the embodiment illustrated in FIG. 4, however, the correction device 401 includes further details regarding a memory block 422 that can be a fast DDR2 RAM memory module. The correction device 401 also includes a distinct multiport memory controller 423 at the direction of a main controller 430, and a set of coefficient fetchers 424 configured to retrieve correction coefficient sets and pass them to a set of individual FIFO's 426. For example, in the embodiment illustrated in FIG. 4, nine separate FIFO's 426 are shown, including a sub-group of three FIFO's 426 for each of the red, green, and blue pixels. Each sub-group of three FIFO's 426 can be for a correction coefficient of red, green, and blue values. In other embodiments, however, more or less FIFO's can be used.

Figure 5:
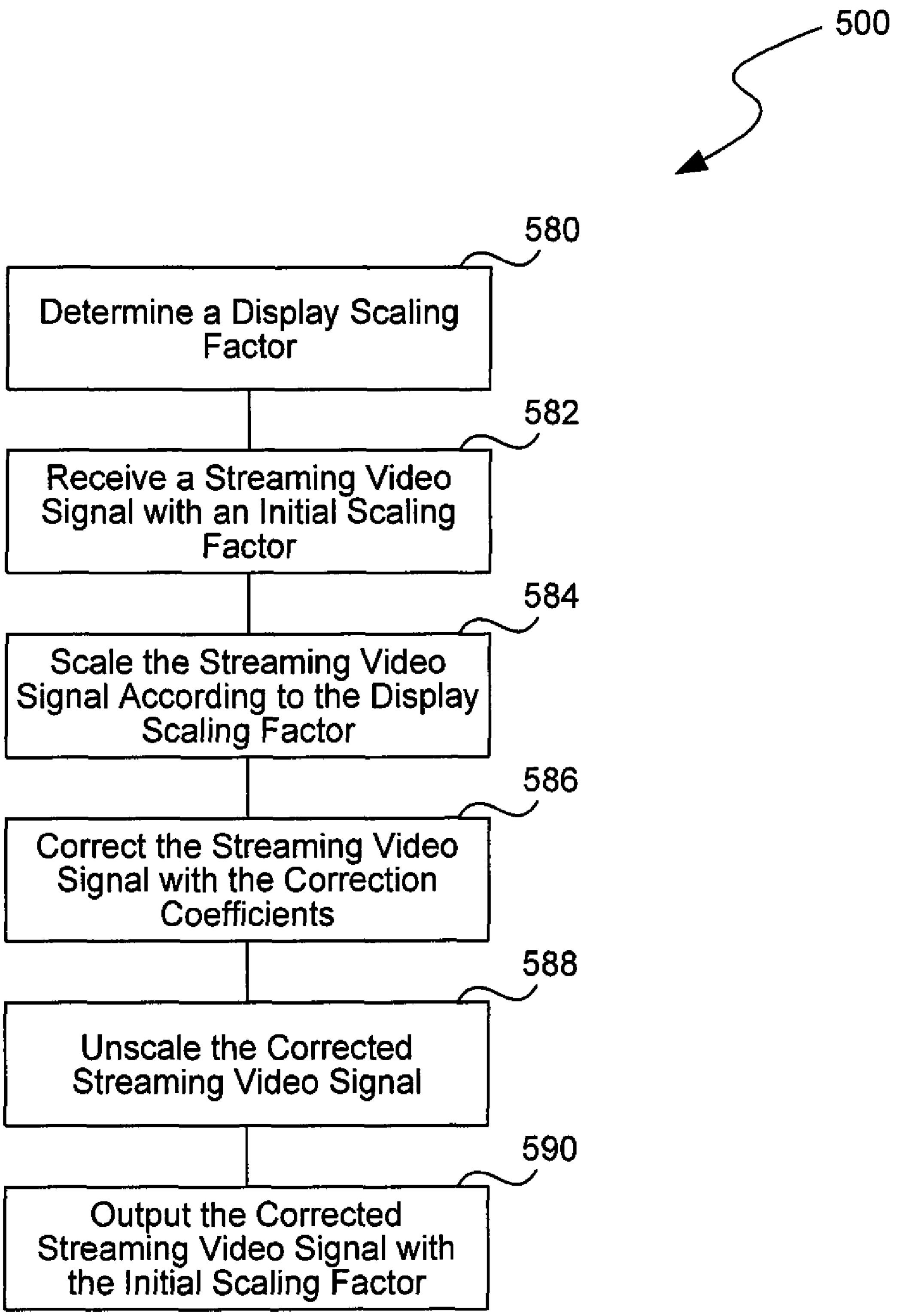
FIG. 5 is a flow diagram of a method or process configured in accordance with yet another embodiment of the disclosure.

FIG. 5 is a flow diagram of a method or process 500 configured in accordance with yet another embodiment of the disclosure that can be implemented by the pixel uniformity correction devices 100, 400 described above with reference to FIGS. 1-4. According to some aspects of the present disclosure, a streaming video signal may be scaled to accommodate different signs or displays that will ultimately show the streaming video signal. In certain embodiments, for example, a scaling factor may be applied to the streaming video signal after the streaming video signal has been corrected or adjusted by a correction device according to the present disclosure. In these cases, however, the scaling factor may distort the appearance of the signal on the display. Accordingly, it may be beneficial to correct or otherwise adjust the streaming video signal to take into account the scaling factor that will ultimately be applied to the streaming video signal.

More specifically, and with reference to FIG. 5, the illustrated method 500 to account for such a scaling factor includes determining a display scaling factor (block 580). The display scaling factor is the scaling factor that will scale the streaming video signal after the streaming video signal leaves the correction device. The method also includes receiving the streaming video signal at the correction device with an original or initial scaling factor (block 582). After receiving the signal, the method further includes scaling the streaming video signal according to the display scaling factor (block 584). With the signal scaled according to the display scaling factor, the method 500 further includes correcting or otherwise adjusting the streaming video signal with the correction coefficients as described in detail above (block 586). Once the streaming video signal is corrected, the method 500 further includes unscaling the corrected streaming video signal back to the initial scaling factor (block 588), and outputting the corrected video streaming video signal according to the initial scaling factor (block 590).

Accordingly, when the corrected streaming video signal is subsequently scaled according to the display scaling factor after exiting the correction device, the streaming video signal will have the appropriate one-to-one correspondence between the video stream and the physical pixels of the display. In other embodiments, however, such as when the streaming video signal will not be scaled after exiting the correction device, the correction device can still scale the video signal according to a desired scale factor without having to unscale the streaming video signal according to the initial scaling factor. Rather, the correction device can output the corrected streaming video signal at the desired scale factor for display on a sign.

From the foregoing, it will be appreciated that specific embodiments of the disclosure have been described herein for purposes of illustration, but that various modifications may be made without deviating from the spirit and scope of the various embodiments of the disclosure. For example, although the display values are described above as converted from 8 bits to 16 bits, in other embodiments these display values can be converted to bit values other than 16 bits. Further, while various advantages associated with certain embodiments of the disclosure have been described above in the context of those embodiments, other embodiments may also exhibit such advantages, and not all embodiments need necessarily exhibit such advantages to fall within the scope of the disclosure. Accordingly, the disclosure is not limited, except as by the appended claims.

We claim:

1. A video correction system for correcting a video signal to be shown on a display, the video correction system comprising:

- a first interface configured to receive a streaming video signal and isolate display values of the streaming video signal;
- a selection circuit coupled to first interface and configured to stream the display values to a multiplier according to clock signals associated with the corresponding display values;
- a storage circuit configured to store correction coefficients corresponding to individual display values;
- a fetch circuit coupled to the storage circuit and configured to retrieve the correction coefficients from the storage circuit and present the correction coefficients to the multiplier along with the corresponding display values according to the associated clock signals, wherein the multiplier adjusts the display values with the corresponding correction coefficients; and
- a second interface coupled to the multiplier and configured to regroup individual corrected display values into a corrected streaming video signal and communicate the corrected streaming video signal to the display.

2. The video correction system of claim 1 wherein the display values comprise individual color components of the streaming video signal.

3. The video correction system of claim 2 wherein the individual color components comprise red, green, and blue components of corresponding pixels of the streaming video signal.

4. The video correction system of claim 1 wherein the clock signals are associated with corresponding pixels of the streaming video signal.

5. The video correction system of claim 1 wherein the display comprises multiple light emitting elements, and wherein the storage circuit is configured to store one or more correction coefficients for each of the light emitting elements.

6. The video correction system of claim 1 wherein the multiplier is configured to adjust each display value according to the corresponding correction coefficient.

7. The video correction system of claim 1 wherein the correction coefficients are calculated to correct the corresponding display values to display the corrected streaming video signal on the display according to a desired appearance.

8. The video correction system of claim 1, further comprising:

- a conversion circuit coupled to the first interface and configured to convert the display values from an initial gamma space into a linear space; and
- a reconversion circuit coupled to the multiplier and configured to convert corrected display values into the initial gamma space.

9. The video correction system of claim 1 wherein:

- the display values have corresponding initial bit levels;
- the video correction system converts the initial bit levels of the display values to higher bit levels prior to the adjustment of the display values by the multiplier; and
- the video correction system reconverts the higher bit levels of the corrected display values to the initial bit levels prior to communicating the corrected streaming video signal to the display.

10. The video correction system of claim 9 wherein the initial bit level is 8 bits and the higher bit level is 16 bits.

11. The video correction system of claim 1 wherein the display values of the streaming video signal have an initial input level, and wherein the retrieved correction coefficients vary according to the initial input levels of the corresponding display values.

12. A method of correcting video signals to be shown on a display, the method comprising:

- receiving a streaming video signal with multiple display components;
- transmitting the display components of the streaming video signal to a multiplier according to an associated clock signal for each of the display components;
- fetching correction coefficients from a storage circuit, wherein individual correction coefficients correspond to individual display components;
- presenting the correction coefficients to the multiplier along with the display components according to the associated clock signals;
- adjusting the display components with the corresponding correction coefficients; and
- collecting the adjusted display components into a corrected streaming video signal.

13. The method of claim 12 wherein prior to transmitting the display components to the multiplier the method further comprises isolating individual display components of the streaming video signal.

14. The method of claim 13 wherein receiving the streaming video signal with multiple display components further comprises receiving the streaming video signal with horizontal and vertical position components.

15. The method of claim 12 wherein receiving the streaming video signal with multiple display components comprises receiving the streaming video signal with red, green, and blue color components.

16. The method of claim 12, further comprising transmitting the corrected streaming video signal to the display.

17. The method of claim 12 wherein transmitting the corrected streaming video signal to the display comprises transmitting the corrected streaming video signal to a display having multiple light emitting portions.

18. The method of claim 12 wherein adjusting the display components comprises multiplying each of the display components by the corresponding correction coefficient.

19. The method of claim 18 wherein multiplying each of the display components by the corresponding correction coefficient comprises correcting each of the display components such that the corrected streaming video signal will be shown on the display in a desired appearance.

20. The method of claim 12, further comprising:

converting the display components from an initial gamma space into a linear space with a gamma decoder prior to transmitting the display components to the multiplier; and reconverting the adjusted display components to the initial gamma space with a gamma encoder.

21. The method of claim 12 wherein receiving the streaming video signal comprises receiving the streaming video signal at an initial scaling factor, and wherein the method further comprises:

scaling the streaming video signal with a desired scaling factor prior to transmitting the display components to the transmitter; and rescaling the corrected streaming video signal with the initial scaling factor.

22. The method of claim 12 wherein receiving the streaming video signal comprises receiving the streaming video signal with multiple display values each having a first bit level, and wherein the method further comprises:

converting the first bit levels to a second bit level that is greater than the first bit level prior to adjusting the display components;

reconverting the second bit levels to the first bit levels after adjusting the display components.

23. The method of claim 12 wherein receiving the streaming video signal with multiple display components comprises receiving the streaming video signal with multiple display components having corresponding initial input levels, and wherein the method further comprises fetching correction coefficients from the storage circuit, wherein individual correction coefficients vary based on the input level of the corresponding individual display values.

24. An apparatus for processing a streaming video signal to be shown on a visual display, the apparatus comprising a computer-readable storage medium having instructions stored thereon that, when executed by a computing device, cause the computing device to perform operations comprising:

receiving the streaming video signal including display values of pixels of the streaming video signal;

isolating individual display values of corresponding pixels;

passing the isolated display values to a multiplier according to a clock signal for each of the display values;

retrieving a correction value for each of the display values;

passing the correction values to the multiplier according to the clock signal for the corresponding display values; and adjusting the display values based on the corresponding correction values to form a corrected streaming video signal.

25. The apparatus of claim 24 wherein receiving the streaming video signal including display values of pixels compromises receiving the streaming video signal including color values of the pixels, wherein the color values include at least one of the following: red, green, and blue color values.

26. The apparatus of claim 24 wherein adjusting the display values further comprises regrouping the corrected display values into the corrected streaming video signal according to the corresponding clock signals.

27. The apparatus of claim 24 wherein the computer-readable medium further comprises instructions to transmit the corrected streaming video signal to the visual display, wherein the corrected streaming video signal is configured to be shown on the visual display in the adjusted display values.

28. The apparatus of claim 24 wherein the correction values are configured to correct the corresponding display values to display the corrected streaming video signal on the visual display according to a desired appearance.

29. The apparatus of claim 24 wherein the computer-readable medium further comprises instructions to:

convert the display values from an initial gamma space into a linear space prior to passing the display values to the multiplier; and reconverting the adjusted display values to the initial gamma space after adjusting the display values.

* * * * *

UNITED STATES PATENT AND TRADEMARK OFFICE

CERTIFICATE OF CORRECTION

PATENT NO. : 8,264,613 B2
APPLICATION NO. : 12/718870
DATED : September 11, 2012
INVENTOR(S) : Scott Harris et al.

It is certified that error appears in the above-identified patent and that said Letters Patent is hereby corrected as shown below:

In column 5, line 40, delete "9, bits," and insert -- 9 bits, --, therefor.

In column 5, line 40, delete "11, bits," and insert -- 11 bits, --, therefor.

Signed and Sealed this
Twenty-fifth Day of December, 2012

David J. Kappos
*Director of the United States Patent and Trademark Office*